April 11, 1950  D. FRIEND ET AL  2,504,072
FILLERCAP VENT CONSTRUCTION
Filed Sept. 8, 1949

INVENTOR.
LOWELL J. SMITH and
DAWSON FRIEND,
BY: Harold B. Hood.
ATTORNEY.

Patented Apr. 11, 1950

2,504,072

UNITED STATES PATENT OFFICE 2,504,072

FILLERCAP VENT CONSTRUCTION

Dawson Friend and Lowell J. Smith, Connersville, Ind., assignors to Stant Manufacturing Company, Connersville, Ind., a corporation of Indiana Application September 8, 1949, Serial No. 114,648

4 Claims. (Cl. 220—44)

The present invention relates to cap vent construction, and is primarily concerned with the provision of an improved vented closure cap particularly adapted for vehicle fuel tanks or the like. The primary object of the invention is to provide a novel, unusually efficient, but very inexpensive construction which will effectively prevent slopping of liquid fuel from a vehicle tank, resulting from centrifugal or inertia forces encountered during the operation of a motor vehicle, while freely venting such tank to the atmosphere to permit free flow of fuel through the engine supply system and to prevent the undesirable accumulation of gases in the tank.

A further object of the invention is to provide a cap construction providing a clear air passage between the interior of the tank with which such cap is associated and the atmosphere, such passage being of such character, however, as to impede liquid flow therethrough. A further object of the invention is so to construct such passage that a flow of liquid therethrough, produced by centrifugal force resulting from rapid travel of an automobile, for instance, around a highway curve, will be so retarded that liquid will not reach the discharge end of such passage before the negotiation of any highway curve is completed.

A still further object of the invention is to provide a venting kit or assembly which can be assembled readily with an ordinary closure cap to confer on such a cap the above-described functional advantages.

Still further objects of the invention will appear as the description proceeds.

To the accomplishment of the above and related objects, our invention may be embodied in the form illustrated in the accompanying drawings, attention being called to the fact, however, that the drawings are illustrative only, and that change may be made in the specific construction illustrated and described, so long as the scope of the appended claims is not violated.

Figure 1:
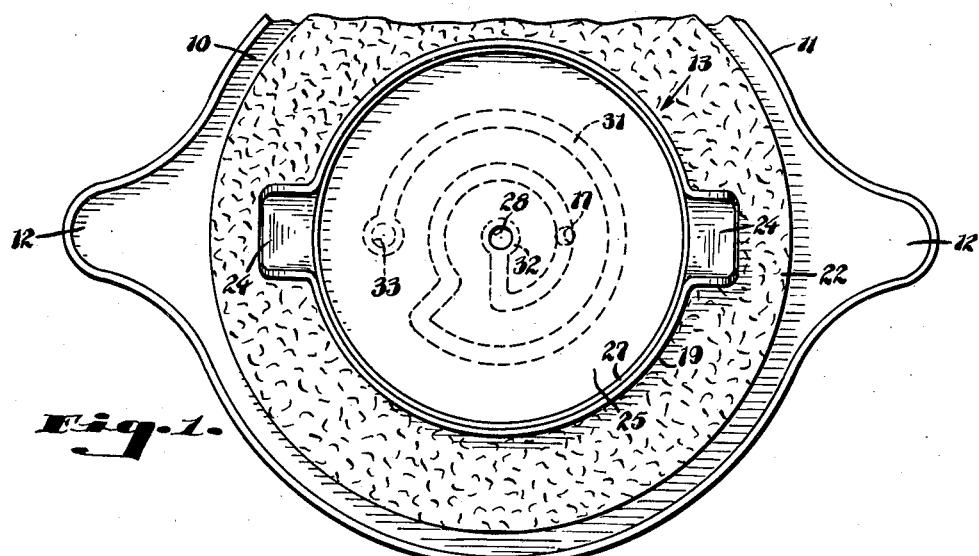
Fig. 1 is a bottom plan view of a cap constructed in accordance with our invention.

In the illustrated embodiment of our invention, we have shown a cap body 10 formed, in accordance with standard practice, with an axially extending perimetral skirt which, in the illustrated form of the invention, is formed to provide oppositely projecting ears 12, 12. A shell 13 comprises a central domed portion 14 which is centrally perforated to receive a rivet 15 passing, also, through a central perforation in the cap body to secure the shell to the cap in pendent relation. The cap body 10 and the shell dome 14 are formed with registering ports 16 and 17 leading from the chamber 18 defined within the shell. The shell is formed to provide a downwardly-facing open mouth bounded by a perimetral, axially extending flange 19.

Preferably, a gasket 20 surrounds the dome 14 and is pressed against the cap body by an annular spring or washer 21 confined between said gasket 20 and a flexible gasket 22 which, when the cap is assembled with a fuel tank filler neck 23, bears on said neck to seal the same. The shell 13, in the illustrated form of the invention, is provided with diametrically projecting ears 24 engageable with the cammed flange of the filler neck to retain the cap in closing relation to said neck.

A discoid closure element 25 is adapted to be received in the mouth of the shell 13, said element presenting a flat face 26 to the interior of the chamber 18, and having a perimetral flange 27 which engages the wall 19 of the shell 18 with a press fit. The element 25 is formed with a port 28 which, in the illustrated embodiment of the invention, is located at the center of the face 26.

Bearing upon the face 26 of the element 25 is a discoid diaphragm 29; and the face of said diaphragm engaged with the face 26 of the closure element 25 is provided with a tortuous, restricted groove 31 which, in the illustrated embodiment of the invention, is produced by deformation of the body of the diaphragm, as indicated at 30. One point 32 in the length of the groove 31 registers, in the assembled condition of the parts, with the port 28 in the closure element 25, and preferably the groove will be somewhat enlarged at that point, as at 32. At a point in the length of the groove 31 remote from the point 32, the diaphragm 29 is formed with a port 33 therethrough. In the illustrated embodiment of the invention, the point 32 is at one end of the groove and the port 33 is at the other end of the groove, and we presently believe that arrangement to be optimum. An annular gasket 34 bears upon the opposite surface of the diaphragm 29, being located wholly outside the area in which the groove 31 is arranged; and the parts 25, 29 and 34 are so positioned within the shell 13 that the gasket 34 is pressed tightly against the intermediate wall section 35 of the shell 13 between the dome 14 and the flange 19.

Thus, the diaphragm 29 is tightly confined between the gasket 34 and the closure element 25, with its grooved face pressed solidly against the plane surface 26 of the closure element 25, whereby said closure element cooperates with the groove 31 in the diaphragm to define a closed, restricted, tortuous channel or passage connecting the ports 28 and 33.

Air or gases, of course, will flow freely, through that passage, between the interior of the tank and the chamber 18, as well as through the registering ports 16 and 17. The channel, however, is so restricted that liquid can flow therethrough only at a greatly retarded rate; and the length and convolutions of the channel are such that, at that flow rate, liquid never completely traverses the channel to emerge into the chamber 18.

Figure 2:
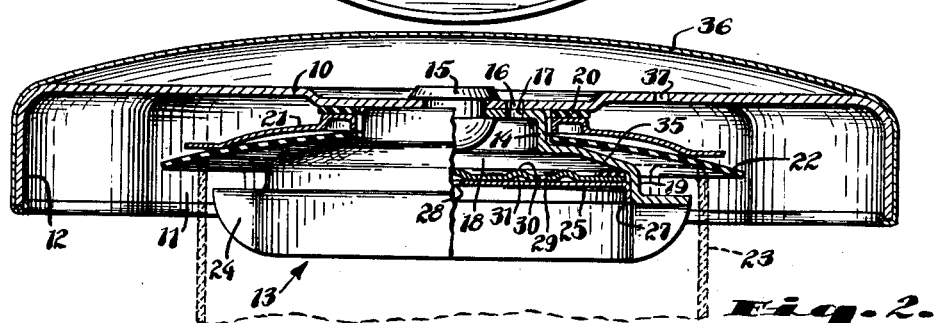
Fig. 2 is a transverse sectional view thereof.
Figure 3:
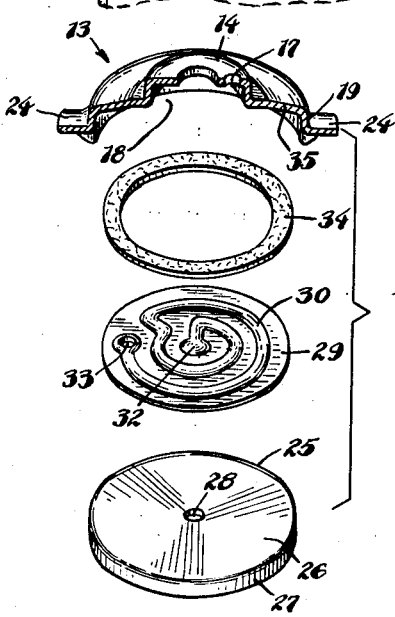
Fig. 3 is an exploded perspective of a conversion kit, showing also, in section, the shell with which such a kit may be associated.

While our cap may be used in the form thus far described, in some cases it is desirable to provide an additional housing or escutcheon element such as that indicated at 36 in Fig. 2, such element having a close fit with the flange 12 and, at least in some instances, being clinched under the free edge of said flange. Where such a housing element is used, of course, we must provide for relief of the chamber defined between said element and the roof of the body 10; and for that purpose, the body 10 may be provided with a further port 37 located outside the region occupied by the gasket 20.

We claim as our invention:

1. A vented cap for a vehicle fuel tank or the like comprising a body, a shell pendent from said body and defining a downwardly-opening chamber having a mouth, said chamber being provided with a port spaced from said mouth, a closure element received in said chamber mouth and provided with a restricted port therethrough, and a diaphragm received in said chamber and bearing against said closure element, said diaphragm being provided, in its face engaging said closure, with a tortuous groove, one end of said groove registering with said port in said closure element, and said diaphragm further being provided with a port therethrough opening from a point in said groove remote from said one groove end.

2. A vented cap for a vehicle fuel tank comprising a body having a perimetral, axially extending flange, a shell formed to define a central dome, a radially-outwardly-extending intermediate wall section, and a terminal, axially-extending perimetral flange having a diametrical dimension less than that of said body flange, and defining an open mouth, means securing said dome centrally to said body, gasket means surrounding said dome and pressed against said body, said dome and body being provided with registering ports therethrough, a closure element received in said shell mouth in sealing engagement with said terminal flange, a diaphragm bearing upon the inner face of said closure element, said diaphragm being provided, in its face engaging said closure, with a restricted, tortuous groove, and an annular gasket compressed between said diaphragm and said shell intermediate wall section, said diaphragm being provided with a port opening therethrough from said groove, and said closure being provided with a port therethrough registering with a point in the length of said groove remote from said diaphragm port.

3. The cap of claim 2 including a domed housing enclosing said body and securely gripping said body flange, said body being provided with a port therethrough located radially between said first-named gasket and said body flange.

4. A venting assembly for fuel tank closure caps comprising a discoid, peripherally skirted element provided with a port therethrough, a discoid diaphragm provided in one face with a restricted, tortuous groove, said diaphragm being disposed with said one face in intimate contact with a face of said first-named element whereby said element cooperates with said diaphragm groove to define a restricted, tortuous, closed passage, said diaphragm being provided with a port therethrough opening from said groove, and said element being provided with a port therethrough registering with said groove at a point in the length thereof remote from said diaphragm port, and an annular gasket arranged in contact with the opposite face of said diaphragm and wholly disposed radially outside the location of said groove.

DAWSON FRIEND.
LOWELL J. SMITH.

No references cited.